United States Patent
Li et al.

(10) Patent No.: US 12,319,132 B2
(45) Date of Patent: Jun. 3, 2025

(54) ELECTRIC DRIVE AXLE AND AUTOMOBILE

(71) Applicant: TOP GEAR POWERTRAIN TECHNOLOGY CO., LTD, Shanghai (CN)

(72) Inventors: Shan Li, Shanghai (CN); Yueyue Deng, Shanghai (CN); Haifeng Lu, Shanghai (CN)

(73) Assignee: TOP GEAR POWERTRAIN TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 17/921,448

(22) PCT Filed: Jun. 7, 2022

(86) PCT No.: PCT/CN2022/097260
§ 371 (c)(1),
(2) Date: Oct. 26, 2022

(87) PCT Pub. No.: WO2023/206720
PCT Pub. Date: Nov. 2, 2023

(65) Prior Publication Data
US 2024/0383321 A1    Nov. 21, 2024

(30) Foreign Application Priority Data

Apr. 25, 2022  (CN) .......................... 202210449501.2

(51) Int. Cl.
*B60K 1/02* (2006.01)
*B60K 7/00* (2006.01)
(Continued)

(52) U.S. Cl.
CPC .............. *B60K 1/02* (2013.01); *B60K 7/0007* (2013.01); *B60K 17/165* (2013.01); *F16H 48/06* (2013.01)

(58) Field of Classification Search
CPC ...... B60K 1/02; B60K 7/0007; B60K 17/165; B60K 6/445; F16H 48/00–2048/426
See application file for complete search history.

(56) References Cited

U.S. PATENT DOCUMENTS

2022/0032755 A1    2/2022   Seemann et al.

FOREIGN PATENT DOCUMENTS

| CN | 107323255 A | 11/2017 |
| CN | 107985068 A | 5/2018 |

(Continued)

OTHER PUBLICATIONS

CN 202210449501.2 The First Office Action Mail Date Nov. 2, 2022.
PCT/CN2022/097260 PCT ISR ISA210.

*Primary Examiner* — Tinh Dang
(74) *Attorney, Agent, or Firm* — IPRO, PLLC

(57) ABSTRACT

The present disclosure provides an electric drive axle and an automobile, comprising an output shaft, a spindle and at least one driving assembly, the spindle includes two half shafts connected with a differential, and each driving assembly includes a motor and an input shaft connected to the motor in a transmission way, and the output shaft connected to the differential in a transmission way, and the output shaft is sleeved on the corresponding half shaft; a plurality of driving assemblies are arranged on two sides of the output shaft; the electric drive axle further comprises at least two gear transmission assemblies and at least one sliding sleeve shifting mechanism, the input shaft and the output shaft are connected through the corresponding gear transmission assembly in a transmission way, and the sliding sleeve (Continued)

shifting mechanism is slidably sleeved on the output shaft; when the electric drive axle is in different speeds, the sliding sleeve shifting mechanism is connected to the corresponding gear transmission assembly in a transmission way, so as to carry out the power transmission in different speeds, which has a variety of power flow modes to meet requirements of the vehicle under light duty and heavy duty.

6 Claims, 8 Drawing Sheets

(51) Int. Cl.
*B60K 17/08* (2006.01)
*B60K 17/16* (2006.01)
*F16H 48/06* (2006.01)

(56) References Cited

FOREIGN PATENT DOCUMENTS

| | | | | |
|---|---|---|---|---|
| CN | 110848346 | A | 2/2020 | |
| CN | 111365425 | A | 7/2020 | |
| CN | 112644262 | A | 4/2021 | |
| CN | 112706597 | A | 4/2021 | |
| CN | 112706598 | A | 4/2021 | |
| CN | 112918236 | A | 6/2021 | |
| CN | 113635709 | A | 11/2021 | |
| CN | 214874180 | U | 11/2021 | |
| CN | 113978225 | A | 1/2022 | |
| CN | 114083969 | A | 2/2022 | |
| DE | 102019206967 | A1 * | 11/2020 | ............. B60K 17/08 |
| WO | 2017185901 | A1 | 11/2017 | |
| WO | 2018121515 | A1 | 7/2018 | |
| WO | WO-2019213792 | A1 * | 11/2019 | ............... B60K 1/02 |

* cited by examiner

ELECTRIC DRIVE AXLE AND AUTOMOBILE

FIELD OF THE INVENTION

The present disclosure relates to the technical field of vehicles, in particular to an electric drive axle and an automobile.

BACKGROUND OF THE INVENTION

The transmission system and the torque increase-differential system are important parts of the electric drive axle. The main task of the transmission system and the torque increase-differential system is to transmit the power from the drive motor or other equipment through meshing gear and other mechanisms, to achieve deceleration and torque increase or speed increase and torque reduction and differential power output, thereby driving the movement and operation of vehicles or other transport machinery. Due to the wide range of weights of goods carried by commercial vehicles, e.g. from empty to 50, 60 tons and heavier load; and their transportation distances are varied, ranging from ten kilometers to thousands of kilometers, and there are various transportation road conditions, such as flat roads, small slopes, large slopes, dry roads, soft roads, muddy roads. In such a diverse range of operating environments, in order to ensure vehicle operating capabilities and operating efficiency under various operating conditions, it is necessary to ensure that the power output to the vehicle under different operating conditions is also diversified, so that the vehicle can obtain a certain speed and can provide sufficient traction and high efficiency. Most of the electric drive axle systems on the market now have a single speed ratio, which can only provide a single power flow mode, and cannot take into account speed and traction at the same time; and for one speed ratio, there is only one power flow. When the speed ratio is relative low, the required speed can be obtained, but the traction for climbing will be insufficient; while a higher speed ratio will result in a lower speed and then affect efficiency. Although some existing electric drive axles on the market are equipped with two-speed transmission systems and can provide two power flow modes, for long-distance traction vehicles with variable road conditions and variable loads, they can only meet high efficiency requirements under some working conditions, and for many working conditions, vehicle speed, traction and efficiency cannot be taken into account at the same time. In addition, most of the electric drive axles on the market are large in structure and unsprung mass, which will affect the reliability and driving comfort of the vehicles.

SUMMARY OF THE INVENTION

In view of the above problems, the present disclosure provides an electric drive axle and an automobile to solve the above or other problems in the prior art. In order to solve the above technical problems, the technical solution adopted in the present disclosure is: an electric drive axle, including an output shaft, a spindle and at least one driving assembly, the spindle includes two half shafts connected to a differential, and each driving assembly includes a motor and an input shaft connected with the motor in a transmission way, the output shaft is connected to the differential in a transmission way, and the output shaft is sleeved on the corresponding half shaft; a plurality of driving assemblies are arranged on two sides of the output shaft; the electric drive axle further includes at least two gear transmission assemblies and at least one sliding sleeve (dog-clutch) shifting mechanism, the input shaft and the output shaft are connected through corresponding gear transmission assembly in a transmission way, and the sliding sleeve shifting mechanism is slidably sleeved on the output shaft. When the electric drive axle is in different speeds, the sliding sleeve shifting mechanism is connected to the corresponding gear transmission assembly in a transmission way to transmit power in different speeds.

Further, each gear transmission assembly includes a driving gear arranged on the input shaft, and a driven gear meshing with the driving gear;
the driven gear is rotatably arranged on the output shaft, and when the electric drive axle is in a first transmission mode, the sliding sleeve shifting mechanism is controlled to connect to corresponding driven gear in a transmission way;
when the electric drive axle is in a second transmission mode, the sliding sleeve shifting mechanism is controlled to disconnect the transmission with the corresponding driven gear.

Further, the electric drive axle further includes a shift control unit electrically connected to the sliding sleeve shifting mechanism, which is used to control the sliding sleeve shifting mechanism to connect to the corresponding driven gear in a transmission way in the first transmission mode, and control the sliding sleeve shifting mechanism to disconnect the transmission with the corresponding driven gear in the second transmission mode. Further, there are two driving assemblies, and the two driving assemblies are symmetrically arranged on two sides of the spindle. Further, there are three gear transmission assemblies and two sliding sleeve shifting mechanisms, and at least one sliding sleeve shifting mechanism is provided between the two gear transmission assemblies. Further, the drive axle further includes a torque increasing module arranged between the differential and the output shaft, and the output shaft and the differential are connected through the torque increasing module in a transmission way. Further, the torque increasing module includes a planetary gear mechanism, a planetary carrier of the planetary gear mechanism is connected to the differential, and a sun gear of the planetary gear mechanism is connected to the output shaft.

Further, a gear ratio of the planetary gear mechanism is 1:15.

The present disclosure also relates to an automobile, which includes the electric drive axle mentioned above.

Due to the adoption of the above technical solution, the transmission module and the torque increase-differential module are provided, and the two can be designed in an integrated manner or relatively independent. Flexible arrangement and compact structure are conducive to reducing unsprung mass, reducing weight and hardware cost. The first input shaft and the second input shaft are arranged symmetrically, which are respectively connected to the first motor assembly module and the second motor assembly module for the power input. The output main shaft is in a hollow design, and the first shifting mechanism and the second shifting mechanism are arranged on the output main shaft for the power output. The symmetrical power transmission structure makes the two input powers merged and output evenly and stably, so that the transmission chain is short, and the transmission efficiency is high; the transmission module is provided with three speeds to realize a variety of power flow transmission modes, and with the combination of two input motors, up to 9 power flow modes can be obtained, which can be applied to the electric drive axle assembly of commercial vehicles, so that electric commercial vehicles can obtain optimal balance of speed, traction and efficiency, and meet the requirements of traction, speed and efficiency in various working conditions such as light duty, heavy duty, flat road operation, and slope operation to the greatest extent, so as to reduce energy consumption and increase efficiency. In the structure of the electric drive axle, the motors, the shifting transmission mechanisms and the axle are arranged coaxially, such that the product is compact in structure and light in weight, and the forces acting on the carriers, the forces acting on the axle housing and the overall forces acting on the electric drive axle are improved, which is beneficial for the reliability of the product.

BRIEF DESCRIPTION OF THE DRAWINGS

The accompanying drawings illustrate exemplary embodiments of the present disclosure. The accompanying drawings, together with the description, serve to explain the principles of the present disclosure and provide a further understanding of the disclosure, and the accompanying drawings are incorporated in and constitute part of the present specification.

LIST OF REFERENCE NUMBERS

Figure 1:
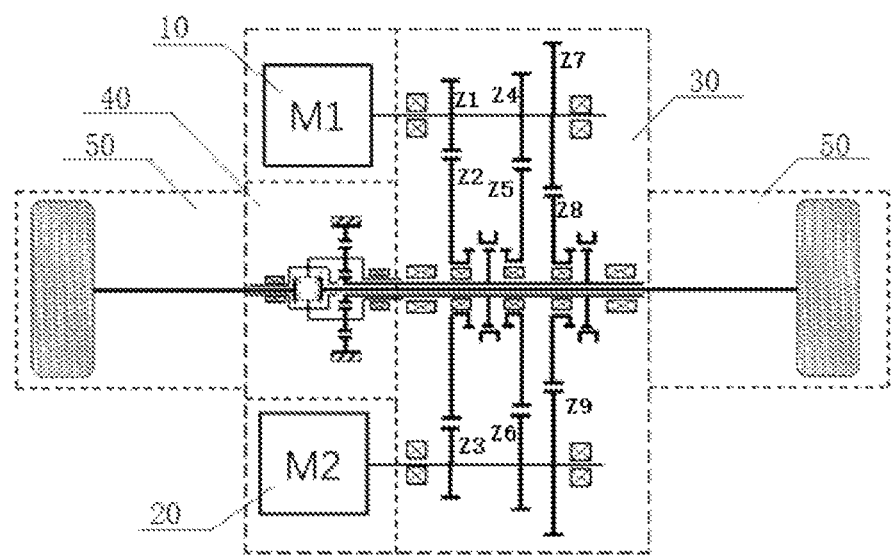
FIG. 1 is a schematic structural diagram of an electric drive bridge according to an embodiment of the present disclosure.

10—first driving assembly, 20—second driving assembly, 30—transmission module, 40—torque increase-differential module, 50—axle assembly module, 301—first input shaft, 302—second input shaft, 303—first shifting mechanism, 304—second shifting mechanism, 305—output main shaft, 401—differential, 402—planetary gear mechanism, 500—first half shaft, 501—second half shaft, 3030—sliding sleeve, Z1—driving gear I, Z2—driven gear I, Z3—driving gear II, Z4—driving gear III, Z5—driven gear II, Z6—driving gear IV, Z7—driving gear V, Z8—driven gear III, Z9—driving gear VI.

DETAILED DESCRIPTION OF THE INVENTION

The present disclosure will be further described in detail below with reference to the accompanying drawings and embodiments. It should be understood that the specific embodiments described herein are only used to explain the related content, but not to limit the present disclosure. In addition, it should be noted that, for the convenience of description, only the parts related to the present disclosure are shown in the drawings.

It should be noted that the embodiments of the present disclosure and the features of the embodiments may be combined with each other if there is no conflict. The present disclosure will be described in detail below with reference to the accompanying drawings and in conjunction with embodiments.

FIG. 1 shows a schematic structural diagram of an embodiment of the present disclosure. This embodiment relates to an electric drive axle and an automobile, which can be applied to electric commercial vehicles, and can also be applied to other transportation vehicles with similar functions to the electric commercial vehicles, especially suitable for commercial vehicles with a wide range of load fluctuations and various and complex working conditions. The electric drive axle has a first motor assembly module, a second motor assembly module and a transmission module. The first motor assembly module and the second motor assembly module are both connected to the transmission module. The first motor assembly module and the second motor assembly module output power to the transmission module, and the transmission module transmits the power. The transmission module has a transmission mechanism with 3 shifting speeds, so that the electric drive axle can realize various power output modes and can flexibly respond to various application conditions of the vehicles. Each speed subjects to two-stage power transmission, which has a high transmission efficiency, reduces the energy consumption of vehicle operation, meets the power requirements of commercial vehicles with diverse loads and operating conditions, and achieves high transportation efficiency and economic benefits.

An electric drive axle, shown in FIG. 1, includes an output shaft 305, a spindle and at least one driving assembly. The spindle includes two half shafts connected with the differential 401, and the two half shafts are respectively connected with a wheel. The differential 401 drives the half shafts to rotate so as to drive the wheels to rotate. Each driving assembly includes a motor and an input shaft connected to the motor in a transmission way for power input;

The output shaft 305 is connected to the differential 401 in a transmission way, and the output shaft 305 is sleeved on the corresponding half shaft for power output;

A plurality of driving assemblies are arranged on two sides of the output shaft 305 for multiple power inputs; and the electric drive axle further includes at least two gear transmission assemblies and at least one sliding sleeve shifting mechanism, the input shaft and the output shaft 305 are connected through corresponding gear transmission assembly in a transmission way, and the sliding sleeve shifting mechanism is slidably sleeved on the output shaft 305. When the electric drive axle is in different speeds, the sliding sleeve shifting mechanism is connected with the corresponding gear transmission assembly in a transmission way to transmit power in different speeds.

In this embodiment, preferably, there are two driving assemblies, and the two driving assemblies are symmetrically arranged on two sides of the spindle.

The above two driving assemblies are respectively a first driving assembly 10 and a second driving assembly 20. The first driving assembly 10 includes a motor M1, and the second driving assembly 20 including a motor M2, which output power and torque. The motors may be a permanent magnet synchronous motor, a switched reluctance motor, an induction motor, or a series of motors having different power and torque, which can be selected and configured according to the actual vehicle model and application conditions. The motor M1 of the first driving assembly 10 and the motor M2 of the second driving assembly 20 may be motors with the same power and torque configuration, or may be motors with different power and torque configurations, which can be configured according to the actual vehicle model and application conditions, and no specific requirements are made here.

When the first driving assembly 10 and the second driving assembly 20 drive the gear transmission assembly for power output, they may drive jointly or independently, which can be selected according to actual needs, and no specific requirements are made here.

Figure 2:
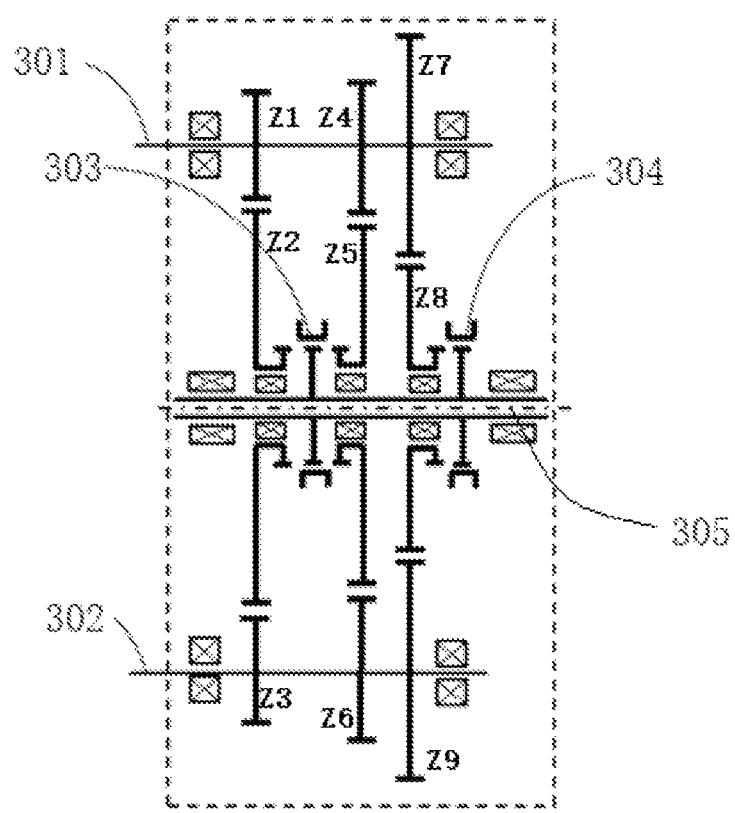
FIG. 2 is a schematic structural diagram of a transmission module of an electric drive axle according to an embodiment of the present disclosure.

As shown in FIG. 2, the above-mentioned first driving assembly 10 further includes a first input shaft 301 connected to the motor M1 in a transmission way, and the second driving assembly 20 further includes a second input shaft 302 connected to the motor M2 in a transmission way. The first input shaft 301 and the second input shaft 302 are arranged on two sides of the output main shaft 305. The arrangement of the first input shaft 301, the second input shaft 302 and the output main shaft 305 is convenient for the installation of the gear transmission assembly, so that the gear transmission assembly can receive the input power transmitted by the first driving assembly 10 and the second driving assembly 20 and transmit power.

The first input shaft 301, the second input shaft 302 and the output main shaft 305 are arranged in parallel, and the first input shaft 301 and the second input shaft 302 are symmetrically arranged on two sides of the output main shaft 305, i.e. the first driving assembly 10 and second driving assembly 20 are arranged on two sides of the output main shaft 305. The input ends of the gear transmission assembly are located on two sides of the output main shaft 305, respectively, and the output end is located on the output main shaft 305, so that the gear transmission assemblies are symmetrical. The two input powers are merged and output evenly and stably. The transmission chain is short, and the transmission efficiency is high.

The above mentioned output main shaft 305 is a hollow structure, so that the output main shaft 305 is connected with the differential 401. At the same time, the connection between the spindle and the differential 401 is convenient, so that the electric drive axle is compact in structure and flexible in arrangement.

Each gear transmission assembly includes a driving gear arranged on the input shaft and a driven gear meshing with the driving gear. The power is transmitted by the meshed transmission between the driving gear and driven gear. The driven gear is arranged on the output shaft 305 rotatably. When the electric drive axle is in the first transmission mode, the sliding sleeve shifting mechanism is connected to the corresponding driven gear in a transmission way to transmit the power in the corresponding speed. When the electric drive axle is in the second transmission mode, the transmission between the sliding sleeve shifting mechanism and corresponding driven gear is disconnected. At this time, no power transmission is performed. The number of gear transmission assemblies and the number of sliding sleeve shifting mechanisms are set according to the requirements of the speeds to meet the power transmission requirements of different speeds. Multiple gear transmission assemblies and multiple sliding sleeve shifting mechanisms consist the transmission module 30 for multiple speed shifting and power transmission.

In this embodiment, preferably, there are three gear transmission assemblies and two sliding sleeve shifting mechanisms, and at least one sliding sleeve shifting mechanism is provided between the two gear transmission assemblies to realize three-speed shift transmission. In the transmission module 30, when the first gear transmission assembly is connected to the first sliding sleeve shifting mechanism 303 in a transmission way, a first shifting speed transmission mechanism is formed, and the first shifting speed transmission is performed. When the second gear transmission assembly is connected to the first sliding sleeve shifting mechanism 303 in a transmission way, a second shifting speed transmission mechanism is formed, and the second shifting speed transmission is performed. When the third gear transmission assembly is connected to the second sliding sleeve shifting mechanism 304 in a transmission way, a third shifting speed transmission mechanism is formed, and the third shifting speed transmission is performed.

The above-mentioned first shifting speed transmission mechanism includes a driving gear I Z1, a driving gear II Z3 and a driven gear I Z2, the driving gear I Z1 is arranged on the first input shaft 301, and the driving gear II Z3 is arranged on the second input shaft 302. The driven gear I Z2 is arranged on the output main shaft 305, and the driven gear I Z2 meshes respectively with the driving gear I Z1 and the driving gear II Z3 for power transmission. The driving gear I Z1 is connected with the first input shaft 301 through a key, so that the driving gear I Z1 rotates with the rotation of the first input shaft 301, and the driving gear II Z3 is connected with the second input shaft 302 through a key, so that the driving gear II Z3 rotates with the rotation of the second input shaft 302, the driven gear I Z2 is arranged on the output main shaft 305 through a bearing, so that the driven gear I Z2 can rotate around the output main shaft 305, and the driven gear I Z2 is provided with an internal teeth, so that the driven gear 1 Z2 can be connected to the first sliding sleeve shifting mechanism 303 in a transmission way for power transmission.

The above-mentioned second shifting speed transmission mechanism includes a driving gear III Z4, a driving gear IV Z6 and a driven gear II Z5. The driving gear III Z4 is arranged on the first input shaft 301, and the driving gear IV Z6 is arranged on the second input shaft 302, the driven gear II Z5 is arranged on the output main shaft 305, and the driven gear II Z5 meshes with the driving gear III Z4 and the driving gear IV Z6 respectively for power transmission. The driving gear III Z4 is connected with the first input shaft 301 through a key, so that the driving gear III Z4 rotates with the rotation of the first input shaft 301, the driving gear IV Z6 is connected with the second input shaft 302 through a key, so that the driving gear IV Z6 rotates with the rotation of the second input shaft 302, and the driven gear II Z5 is arranged on the output main shaft 305 through a bearing, so that the driven gear II Z5 rotates around the output main shaft 305, and the driven gear II Z5 is provided with an internal teeth, so that the driven gear II Z5 is connected to the first sliding sleeve shifting mechanism 303 in a transmission way for power transmission.

The third shifting speed transmission mechanism includes a driving gear V Z7, a driving gear VI Z9 and a driven gear III Z8. The driving gear V Z7 is arranged on the first input shaft 301, the driving gear VI Z9 is arranged on the second input shaft 302, and the driven gear III Z8 is arranged on the output main shaft 305. The driven gear III Z8 meshes with the driving gear V Z7 and the driving gear VI Z9 respectively for power transmission. The driving gear V Z7 is connected with the first input shaft 301 through a key, so that the driving gear V Z7 rotates with the rotation of the first input shaft 301, and the driving gear VI Z9 is connected with the second input shaft 302 through a key, so that the driving gear VI Z9 rotates with the rotation of the first input shaft 302, the driven gear III Z8 is arranged on the output main shaft 305 through a bearing, so that the driven gear III Z8 rotates around the output main shaft 305, and the driven gear III Z8 is provided with an internal teeth, so that the driven gear III Z8 is connected to the second sliding sleeve shifting mechanism 304 in a transmission way for power transmission.

The first input shaft 301 is connected to a rotor shaft of the motor M1, the second input shaft 302 is connected to a rotor shaft of the motor M2. The first driving assembly 10 inputs power, and the first input shaft 301 rotates to drive the driving gear I Z1, the driving gear III Z4 and the driving gear V Z7 to rotate. The second driving assembly 20 inputs power, and the second input shaft 302 rotates to drive the driving gear II Z3, the driving gear IV Z6 and the driving gear VI Z9 to rotate. Through the transmission by meshing, the driven gear I Z2, the driven gear II Z5 and the driven gear III Z8 are driven to rotate to realize power transmission. The first sliding sleeve shifting mechanism 303 and the second sliding sleeve shifting mechanism 304 are both arranged on the output main shaft 305 to perform three-speed power output. The electric drive axle further includes a shift control unit electrically connected with the sliding sleeve shifting mechanisms, which is used for controlling the sliding sleeve shifting mechanism to be connected to the corresponding driven gear in a transmission way in a first transmission mode, and controlling the transmission between the sliding sleeve shifting mechanism and the corresponding driven gear to be disconnected in a second transmission mode, so as to control whether to shift speed s and whether to transmit power.

Figure 14:
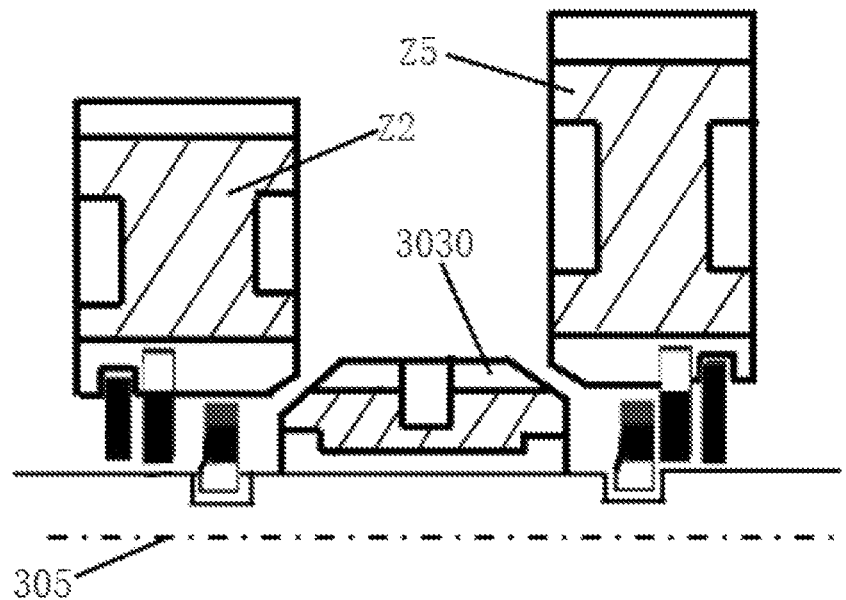
FIG. 14 is a schematic structural diagram of a sliding sleeve shifting mechanism of an electric drive axle according to an embodiment of the present disclosure.

Specifically, as shown in FIG. 14, the above-mentioned sliding sleeve shifting mechanism includes a sliding sleeve 3030 and a shifting fork, the sliding sleeve 3030 is sleeved on the output main shaft 305, and the sliding sleeve 3030 is sleeved on the output main shaft 305 through a spline and can slide along the output main shaft 305. The shifting fork is connected with the sliding sleeve 3030, and the shifting fork is driven by the shift control unit, so that the sliding sleeve 3030 can slide and can be connected to the gear transmission assembly in a transmission way, so as to switch between different speed s. The output main shaft 305 is provided with a spline, and the inside of the sliding sleeve 3030 is provided with internal teeth. Through the meshing of the internal teeth and the spline, the rotation of the sliding sleeve 3030 drives the rotation of the output main shaft 305 to realize the transmission of power. The sliding sleeve 3030 is provided with an external teeth. During power transmission, the sliding sleeve 3030 meshes with the internal teeth of the driven gear I Z2, or the sliding sleeve 3030 meshes with the internal teeth of the driven gear II Z5, or the sliding sleeve 3030 meshes with the internal teeth of the driven gear III Z8 for power transmission. The sliding sleeve 3030 of the second sliding sleeve shifting mechanism 304 can be arranged between the driven gear II Z5 and the driven gear III Z8, or can be arranged on one side of the driven gear III Z8 which opposites to the side of the driven gear II Z5. The setting positions of the sliding sleeve 3030 of the second shifting mechanism 304 can be selected according to actual needs, and no specific requirements are made here.

The sliding sleeve 3030 can slide along the output main shaft 305, so that the sliding sleeve 3030 can mesh with the driven gear I Z2 or the driven gear II Z5 or the driven gear III Z8 to realize speed shifting. The shift control unit drives the shifting fork so as to achieve the sliding of the sliding sleeve 3030. The shift control unit is a driving device, and the driving device can be a motor, a pneumatic valve, a pneumatic cylinder, a hydraulic valve, a hydraulic cylinder, or other driving devices, which is selected according to the needs, and no specific requirements are made here. In the transmission module 30, the driving gear I Z1 and the driven gear I Z2 form a gear pair, and the driving gear II Z3 and the driven gear I Z2 form a gear pair, so as to form the first shifting speed. The first sliding sleeve shifting mechanism 303 meshes with the driven gear I Z2 to form the first shifting speed to transmit power. The driving gear III Z4 and the driven gear II Z5 form a gear pair, and the driving gear IV Z6 and the driven gear II Z5 form a gear pair, so as to form the second shifting speed. The first sliding sleeve shifting mechanism 303 meshes with the driven gear II Z5 to form the second shifting speed to transmit power. The driving gear V Z7 and the driven gear III Z8 form a gear pair, and the driving gear IV Z6 and the driven gear III Z8 form a gear pair, so as to form the third shifting speed. The second sliding sleeve shifting mechanism 304 meshes with the driven gear III Z8 to form the third shifting speed to transmit power. The first sliding sleeve shifting mechanism 303 is arranged between the driven gear I Z2 and the driven gear II Z5, and the second sliding sleeve shifting mechanism 304 is arranged on one side of the driven gear III Z8. When the sliding sleeve 3030 of the first sliding sleeve shifting mechanism and the sliding sleeve 3030 of the second sliding sleeve shifting mechanism do not slide, there is no power transmission output; the sliding sleeve 3030 of the second sliding sleeve shifting mechanism 304 is in the neutral position, the sliding sleeve 3030 of the first sliding sleeve shifting mechanism 303 slides and engages with the driven gear I Z2 in a transmission way, and the power passes through the driving gear I Z1 and the driven gear I Z2 and/or the driving gear II Z3 and the driven gear I Z2 to form the first shifting speed output. The sliding sleeve 3030 of the second sliding sleeve shifting mechanism 304 is in the neutral position, the sliding sleeve 3030 of the first sliding sleeve shifting mechanism 303 slides and engages with the driven gear II Z5 in a transmission way, and the power passes through the driving gear III Z4 and the driven gear II Z5 and/or the driving gear IV Z6 and the driven gear II Z5 to form the second shifting speed output. The sliding sleeve 3030 of the first sliding sleeve shifting mechanism 303 is in the neutral position, the sliding sleeve 3030 of the second sliding sleeve shifting mechanism 304 slides and engages with the driven gear III Z8 in a transmission way, and the power passes through the driving gear V Z7 and the driven gear III Z8 and/or the driving gear VI Z9 and the driven gear III Z8 to form the third shifting speed output. Thereby, the switch between different speeds is realized.

The driving gear I Z1, the driving gear III Z4 and the driving gear V Z7 on the first input shaft 301 and the driving gear II Z2, the driving gear IV Z6 and the driving gear VI Z9 on the second input shaft 302 can be uniformly designed to form a simple structure, which is beneficial for production management and for related cost reduction. There is only two-stage power transmission in all three speeds, and the transmission efficiency reaches more than 95%, which minimizes the energy consumption of vehicle operation. It can flexibly respond to various application conditions of the vehicle, which can not only meet the requirements of the maximum traction force of electric commercial vehicles when climbing, but also meet the requirements of the maximum speed. The 3 shifting speeds can be arranged by timely engaging in different speeds according to the vehicle load, road conditions, and transportation time requirements. With the combination of single-motor drive/dual-motor combined drive, it can timely realize efficient vehicle operation, improve operating efficiency, reduce energy consumption, meet the power requirements of commercial vehicles with various loads and various working conditions, and obtain high transportation efficiency and economic benefits.

Figure 3:
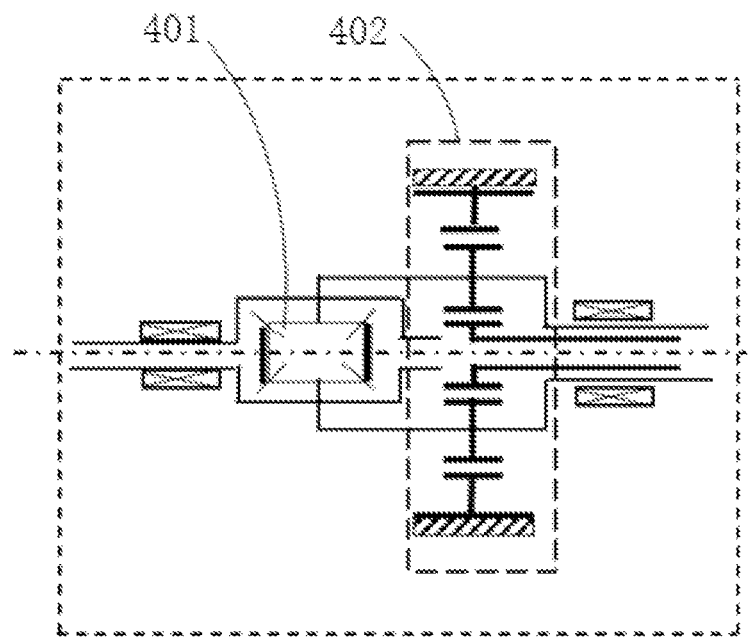
FIG. 3 is a schematic structural diagram of a torque increase-differential module of an electric drive axle according to an embodiment of the present disclosure.

In a further optimized solution, as shown in FIG. 3, the drive axle further includes a torque increasing module arranged between the differential 401 and the output shaft 305, and the output shaft 305 and the differential 401 are connected in a transmission way through the torque increasing module for power transmission. The first driving assembly 10, the second driving assembly 20, the transmission module 30, the differential 401, and the torque increasing module can be independent of each other, or can be integrated into one, or can be integrated two by two, which renders a flexible structural layout, a compact structure, a short power transmission chain, and a high transmit efficiency.

The above torque increasing module and the differential 401 constitute a torque increasing-differential module 40, the torque increasing module includes a planetary gear mechanism 402, the planet carrier of the planetary gear mechanism 402 is connected to the differential 401, and the sun gear of the planetary gear mechanism 402 is connected to the output shaft 305.

The output end of the planetary gear mechanism 402 is a planet carrier, which is connected to the housing of the differential 401 to transmit power. The input end of the planetary gear mechanism 402 is a sun gear, which is connected to the output main shaft 305 to transmit power. In this embodiment, the planetary gear mechanism 402 and the differential 401 in the torque increase-differential module 40 are integrated in design, compact in structure and light in weight. The integrated structure of the planetary gear mechanism 402 and the differential 401 is the same as the structure in the prior art, and are not repeated in details here.

The gear ratio of the planetary gear mechanism 402 is 1:15, which is selected according to actual needs, and no specific requirements are made here.

Figure 4:
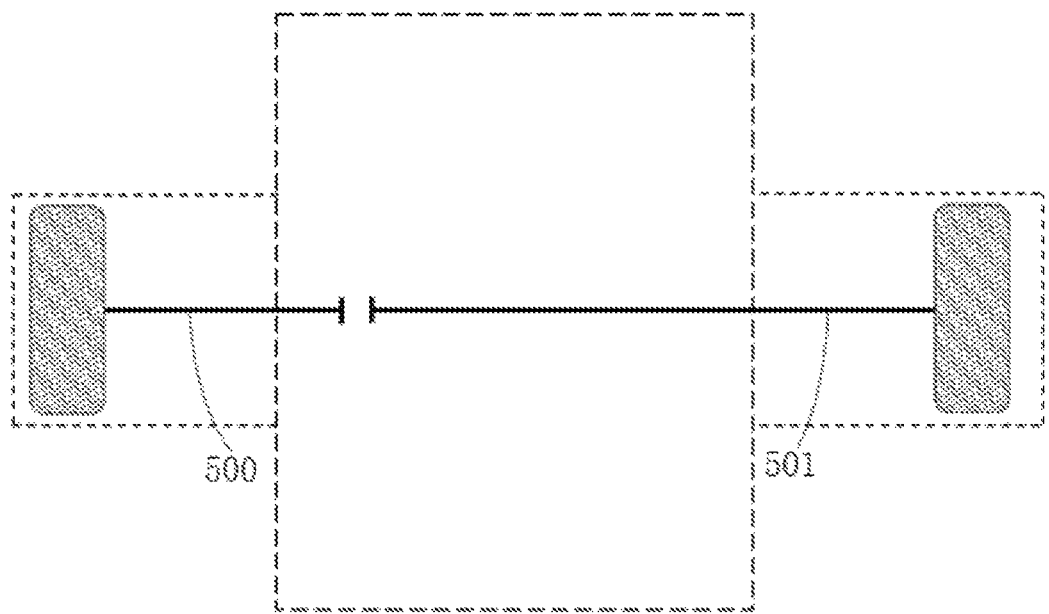
FIG. 4 is a schematic structural diagram of an axle assembly module of an electric drive axle according to an embodiment of the present disclosure.

As shown in FIG. 4, the above-mentioned two half shafts and the wheels connected to each half shaft constitute the structure of the axle assembly module 50. The two half shafts include a first half shaft 500 and a second half shaft 501. The half shaft 500 and the second half shaft 501 are respectively connected to the differential 401, and the first half shaft 500 and the second half shaft 501 are respectively connected to the differential 401 through splines to output power. The first half shaft 500 and the second half shaft 501 are respectively connected with a wheel, and the first half shaft 500 and the second half shaft 501 are arranged in a left and right layout. The second half shaft 501 is connected to the differential 401 by passing through the output main shaft 305, the first half shaft 500 and the second half shaft 501 are supported on the axle housing. The power transmitted by the transmission module 30 is output from the differential 401, and is transmitted to the wheels through the first half shaft 500 and the second half shaft 501. The power of the power transmission route in each speed will always be transmitted to the first half shaft 500 and the second half shaft 501, which is finally transmitted to the wheels to realize motor power drive.

The electric drive axle further includes a carrier module, the carrier module includes the carrier of the first driving assembly 10 and the carrier of the second driving assembly 20, which bear the first driving assembly 10 and the second driving assembly 20. The carrier module further includes a carrier of the gear transmission assembly, which bears gear transmission assembly. The carrier module further includes a carrier of the torque increase-differential module 40, which bears the torque increase-differential module 40. The three carriers can be integrated into one, or can be independently and connected together by fasteners such as bolts. The three carriers are assembled and integrated with the axle assembly module 50, and the carriers are connected to the axle housing.

Figure 5:
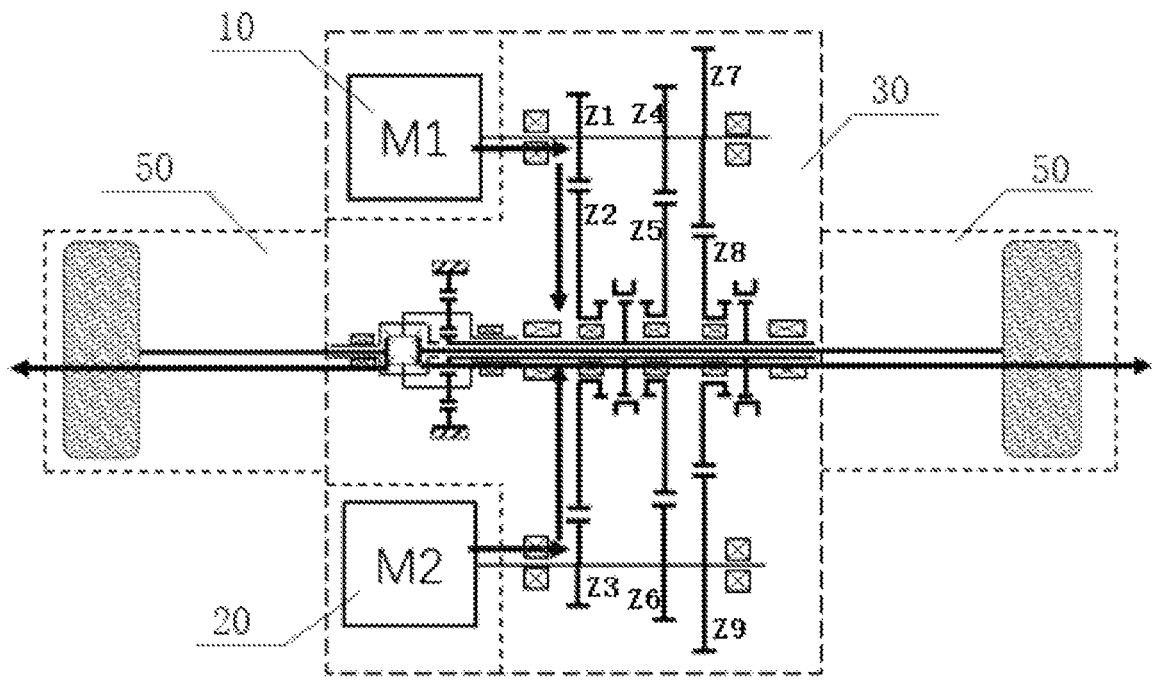
FIG. 5 is a power transmission route map of a dual-motor driving first shifting speed of an electric drive axle according to an embodiment of the present disclosure.

FIG. 5 shows a power transmission route map of a dual-motor driving in the first shifting speed. In this shifting speed, the power input by the first driving assembly 10 and the second driving assembly 20 is transmitted through the first input shaft 301, the second input shaft 302, the driving gear I Z1, the driving gears II Z3, and the driven gear I Z2, so as to form the first shifting speed. Then the power is transmitted into the output main shaft 305 through the sliding sleeve 3030 of the first sliding sleeve shifting mechanism 303, and then into the planetary gear mechanism 402, into the differential 401, and then output to the wheels through the first half shaft 500 and the second half shaft 501.

Figure 6:
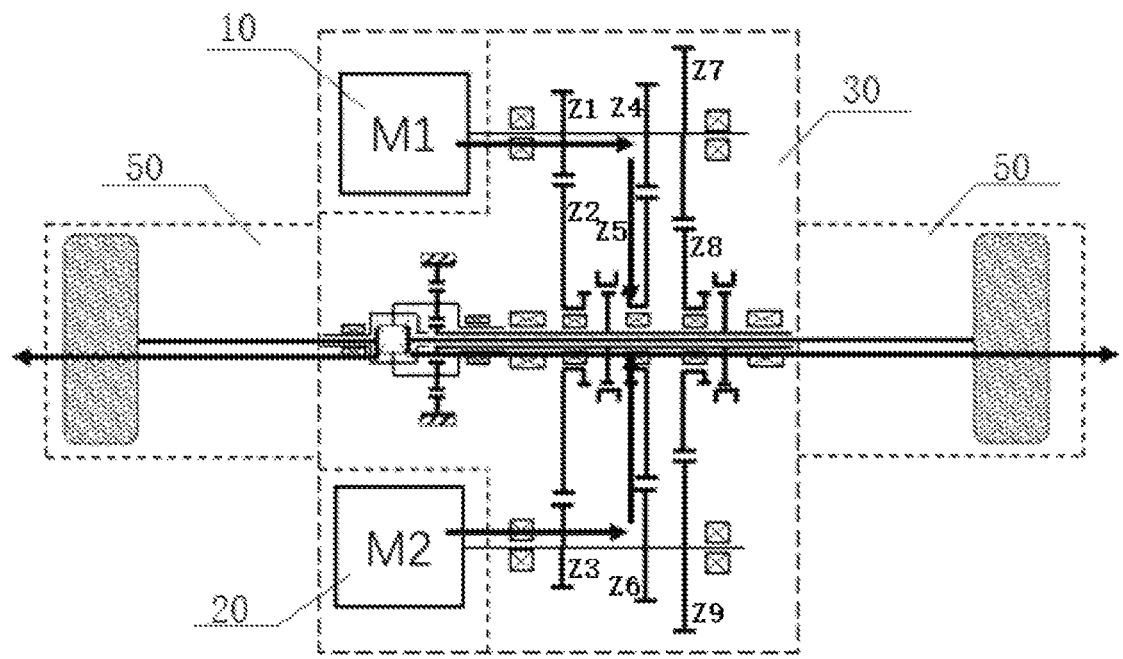
FIG. 6 is a power transmission route map of a dual-motor driving second shifting speed of an electric drive axle according to an embodiment of the present disclosure.

FIG. 6 shows a power transmission route map of a dual-motor driving in the second shifting speed. In this shifting speed, the power input from the first driving assembly 10 and the second driving assembly 20 is transmitted through the first input shaft 301, the second input shaft 302, the driving gear III Z4, the driving gear IV Z6, and the driven gear II Z5, so as to form the second shifting speed. Then the power is transmitted into the output main shaft 305 through the sliding sleeve 3030 of the first sliding sleeve shifting mechanism 303, and then into the planetary gear mechanism 402, into the differential 401, and then output to the wheels through the first half shaft 500 and the second half shaft 501.

Figure 7:
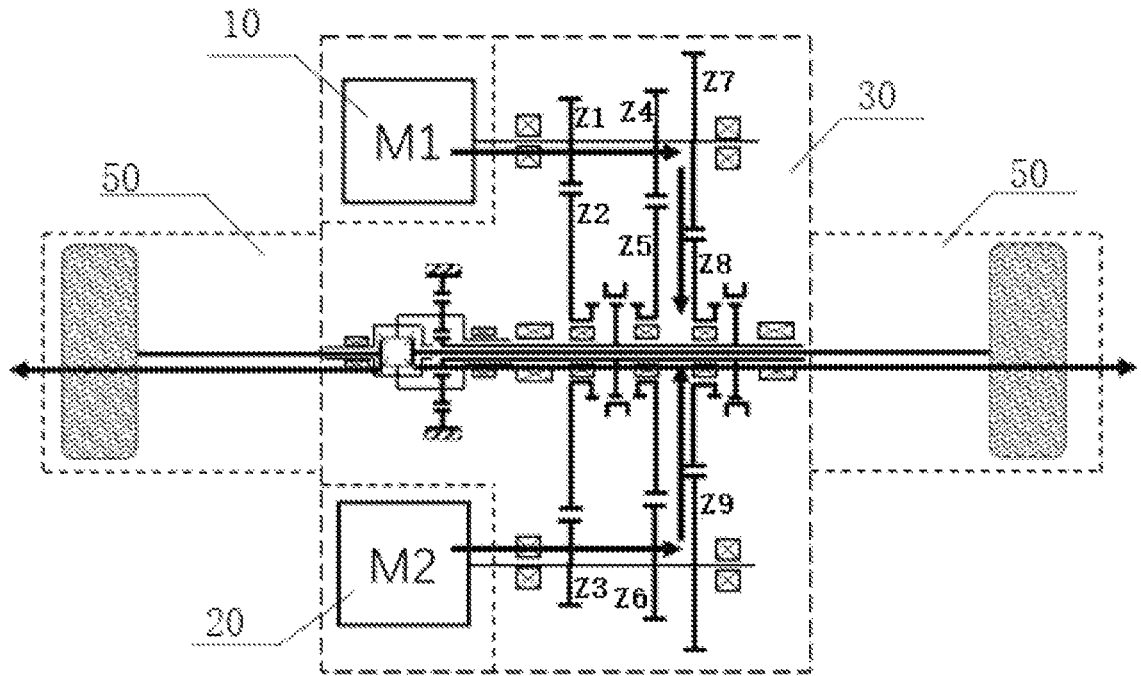
FIG. 7 is a power transmission route map of a dual-motor driving third shifting speed of an electric drive axle according to an embodiment of the present disclosure.

FIG. 7 shows a power transmission route map of a dual-motor driving in the third shifting speed. In this shifting speed, the power input by the first driving assembly 10 and the second driving assembly 20 is transmitted through the first input shaft 301, the second input shaft 302, the driving gear V Z7, the driving gear VI Z9, and the driven gear III Z8, so as to form the third shifting speed. Then the power is transmitted into the output main shaft 305 through the sliding sleeve 3030 of the second sliding sleeve shifting mechanism 304, and then into the planetary gear mechanism 402, into the differential 401, and then output to the wheels through the first half shaft 500 and the second half shaft 501.

Figure 8:
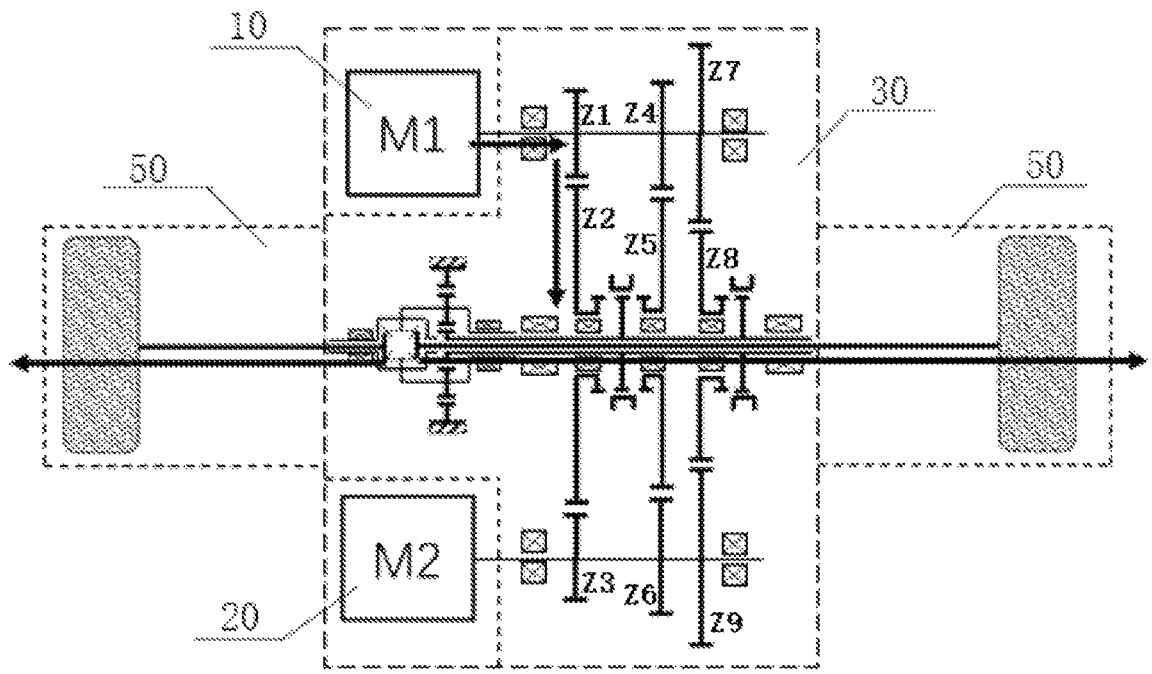
FIG. 8 is a power transmission route map of the single motor M1 driving first shifting speed of an electric drive axle according to an embodiment of the present disclosure.

FIG. 8 shows a power transmission route map of a single-motor M1 driving in the first shifting speed. In this shifting speed, the power input from the first driving assembly 10 is transmitted through the first input shaft 301, the driving gear I Z1 and the driven gear I Z2, so as to form the first shifting speed. Then the power is transmitted into the output main shaft 305 through the sliding sleeve 3030 of the first sliding sleeve shifting mechanism 303, and then into the planetary gear mechanism 402, into the differential 401, and then output to the wheels through the first half shaft 500 and the second half shaft 501.

Figure 9:
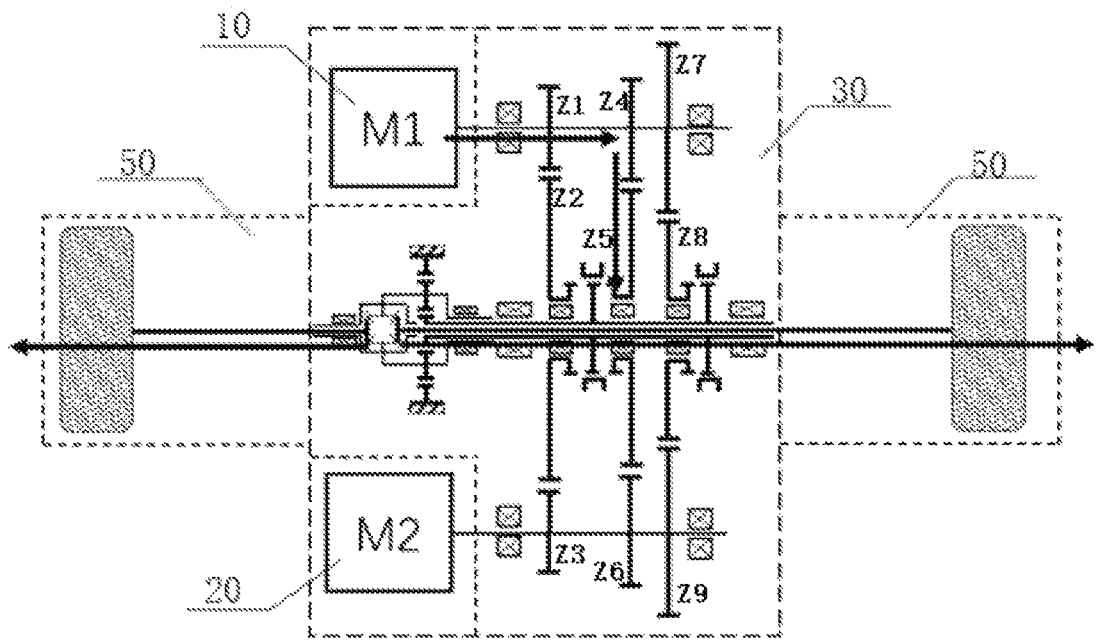
FIG. 9 is a power transmission route map of a single motor M1 driving second shifting speed of an electric drive axle according to an embodiment of the present disclosure.

FIG. 9 shows a power transmission route map of a single-motor M1 driving in the second shifting speed. In this shifting speed, the power input from the first driving assembly 10 is transmitted through the first input shaft 301, the driving gear III Z4 and the driven gear II Z5, so as to form the second shifting speed. Then the power is transmitted into the output main shaft 305 through the sliding sleeve 3030 of the first sliding sleeve shifting mechanism 303, then into the planetary gear mechanism 402, into the differential 401, and then output to the wheels through the first half shaft 500 and the second half shaft 501.

Figure 10:
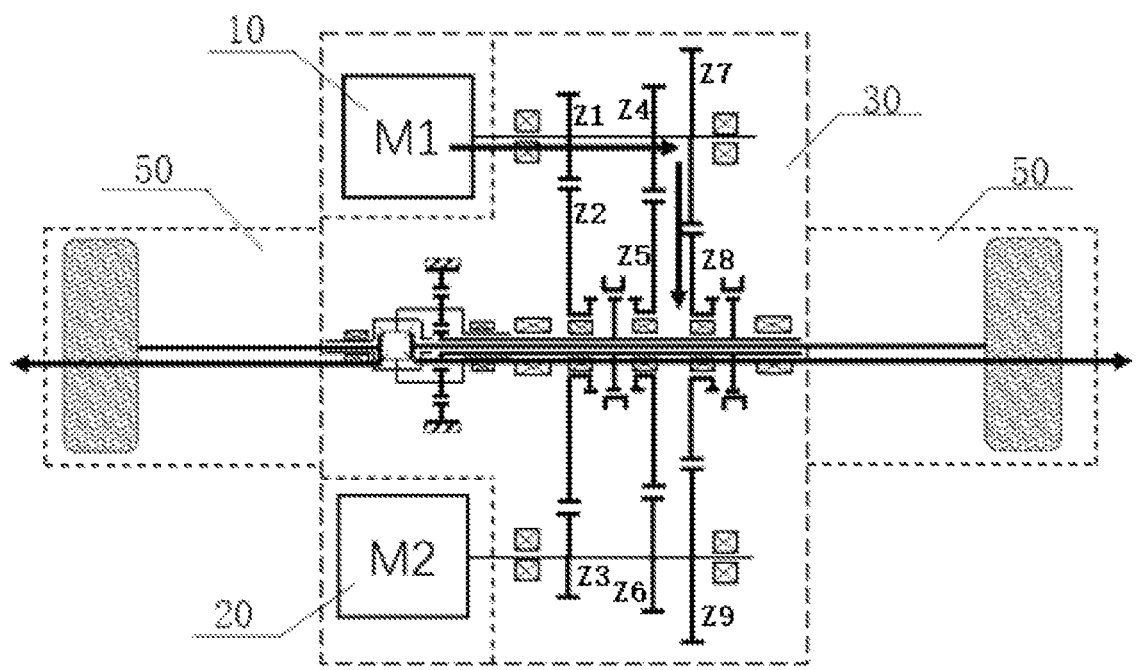
FIG. 10 is a power transmission route map of the single motor M1 driving third shifting speed of an electric drive axle according to an embodiment of the present disclosure.

FIG. 10 shows a power transmission route map of a single-motor M1 driving in the third shifting speed. In this shifting speed, the power input from the first driving assembly 10 is transmitted through the first input shaft 301, the driving gear V Z7, and the driven gear III Z8, so as to form the third shifting speed. Then the power is transmitted into the output main shaft 305 through the sliding sleeve 3030 of the second sliding sleeve shifting mechanism 304, and then into the planetary gear mechanism 402, into the differential 401, and then output power to the wheels through the first half shaft 500 and the second half shaft 501.

Figure 11:
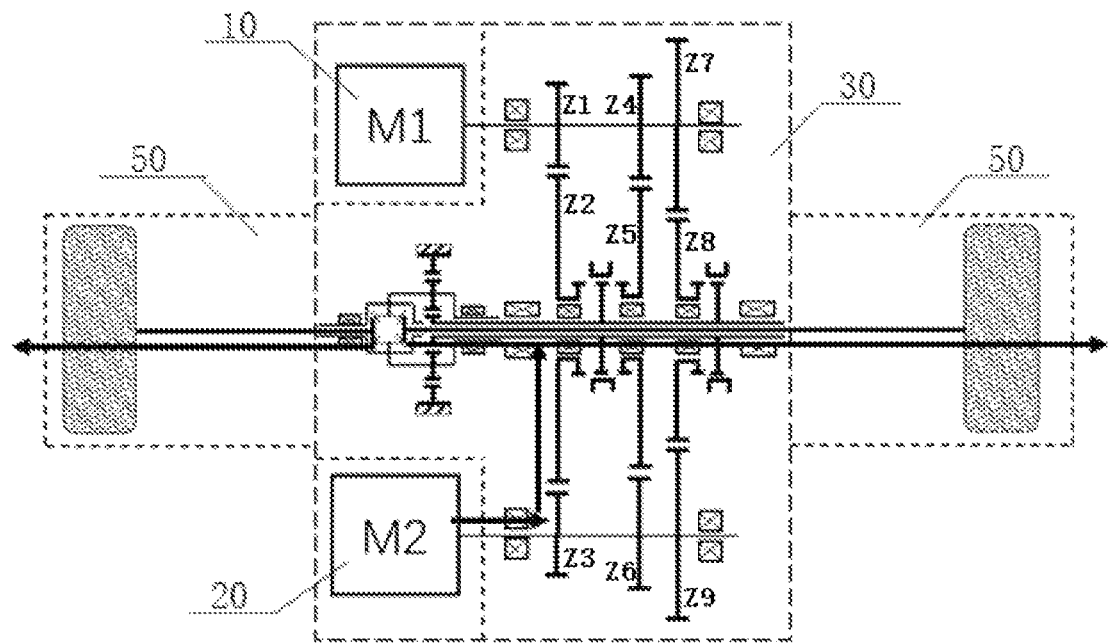
FIG. 11 is a power transmission route map of the single motor M2 driving first shifting speed of an electric drive axle according to an embodiment of the present disclosure.

FIG. 11 shows a power transmission route map of a single-motor M2 driving in the first shifting speed. In this shifting speed, the power input from the second driving assembly 20 is transmitted through the second input shaft 302, the driving gear II Z3, and the driven gear I Z2, so as to form the first shifting speed. Then the power is transmitted into the output main shaft 305 through the sliding sleeve 3030 of the first sliding sleeve shifting mechanism 303, then into the planetary gear mechanism 402, into the differential 401, and then output power to the wheels through the first half shaft 500 and the second half shaft 501.

Figure 12:
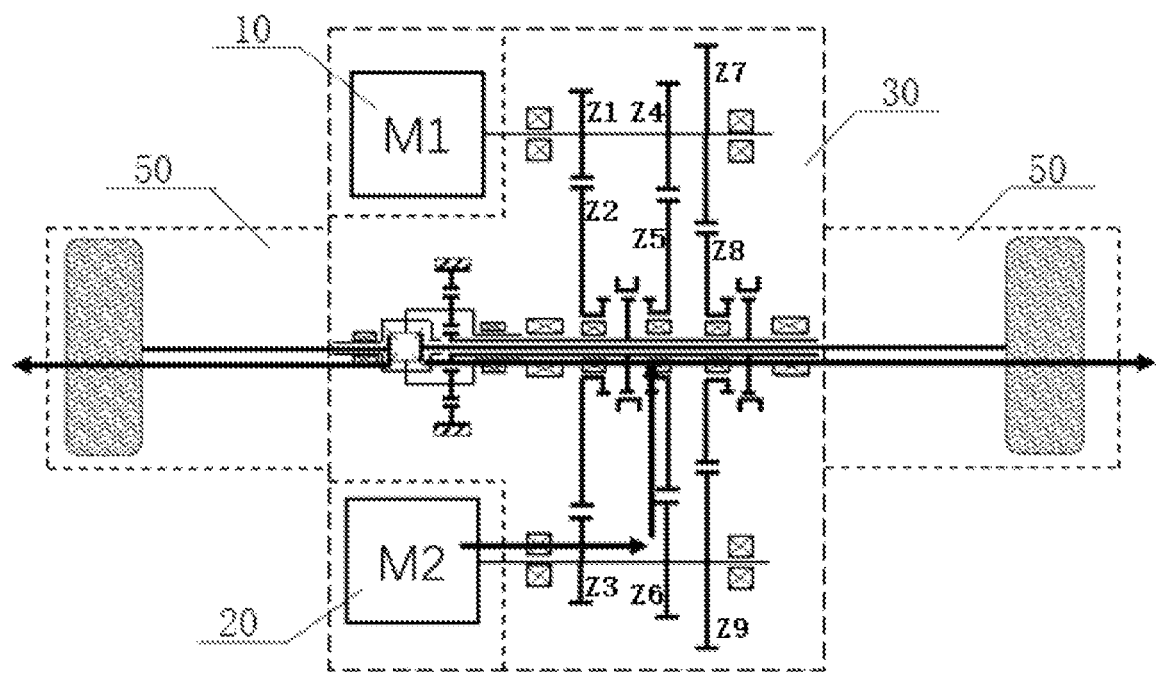
FIG. 12 is a power transmission route map of a single motor M2 driving second shifting speed of an electric drive axle according to an embodiment of the present disclosure.

FIG. 12 shows a power transmission route map of a single-motor M2 driving in the second shifting speed. In this shifting speed, the power input from the second driving assembly 20 is transmitted through the second input shaft 302, the driving gear IV Z6, and the driven gear II Z5, so as to form the second shifting speed. Then the power is transmitted to the output main shaft 305 through the sliding sleeve 3030 of the first sliding sleeve shifting mechanism 303, then into the planetary gear mechanism 402, into the differential 401, and then output power to the wheels through the first half shaft 500 and the second half shaft 501.

Figure 13:
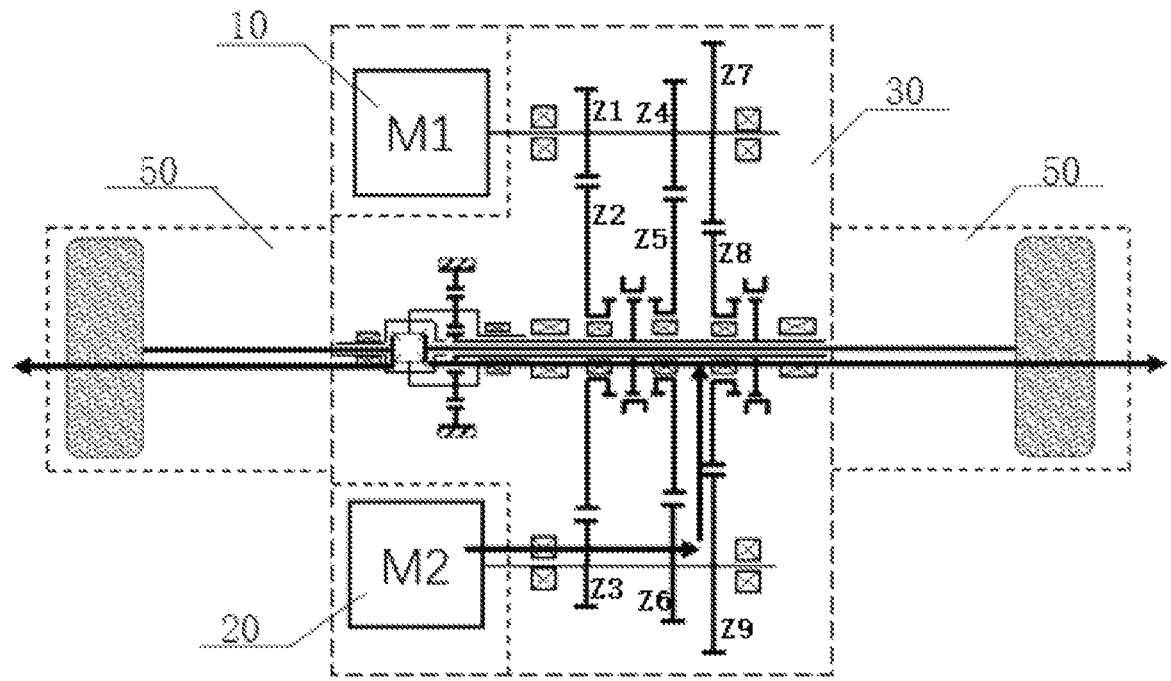
FIG. 13 is a power transmission route map of the single motor M2 driving third shifting speed of an electric drive axle according to an embodiment of the present disclosure.

FIG. 13 shows a power transmission route map of a single-motor M2 driving in the third shifting speed. In this shifting speed, the power input from the second driving assembly 20 is transmitted through the input shaft 12, the sixth driving gear Z9, and the driven gear III Z8, so as to form the third shifting speed. Then the power is transmitted into the output main shaft 305 through the sliding sleeve 3030 of the second sliding sleeve shifting mechanism 304, and then into the planetary gear mechanism 402, into the differential 401, and then output power to the wheels through the first half shaft 500 and the second shaft 501.

The first driving assembly 10, the second driving assembly, and the transmission module 30 are installed and fixed to the axle housing through designed brackets, ensuring that the motor, transmission system and other related components can work safely and efficiently in a stable and reliable environment.

In order to meet the functions of travelling and parking brake, the axle housing should further have structures and interfaces for installing brakes, brake air chambers, mounting brackets and ABS sensor components. In order to meet the load-bearing function, the electric drive axle needs to be connected with the frame, and the electric drive axle housing should have an installation structure and interface for the vehicle suspension system. The transmission system of the electric drive axle adopts a three-speed design, and each module can be independent of each other or highly integrated. The three-speed shift transmission setting can meet the speed ratio and power flow mode requirements of the electric drive axle of electric commercial vehicles as much as possible and can meet the balanced demands of commercial vehicles for traction, speed and high operating efficiency to the greatest extent, and it is especially beneficial for long-distance tractors.

The electric drive axle can choose to set different specific speed ratios according to different vehicles, different working conditions and loads, so as to realize the optimal power and torque transmission of the vehicle, meet the requirements of the vehicle for traction, speed and efficiency, and achieve the lowest vehicle energy consumption requirements.

The present disclosure also relates to an automobile which includes the above-mentioned electric drive axle. Due to the adoption of the above technical solution, the transmission module and the torque increase-differential module are provided, and the two can be designed in an integrated manner or relatively independent, with flexible arrangement and compact structure, which is conducive to reducing unsprung mass, reducing weight and hardware cost; the first input shaft and the second input shaft are arranged symmetrically, and are respectively connected with the first motor assembly module and the second motor assembly module for the power input. The output main shaft is in hollow design, and the first shifting mechanism and the second shifting mechanism are arranged on the output main shaft for the power output. Symmetrical power transmission structure forms a evenly and stably merged output of the two input powers, the transmission chain is short, and the transmission efficiency is high; the transmission module is provided with three speeds to realize a variety of power flow transmission modes, and in combination with the two input motors, up to 9 power flow modes can be obtained, which can be applied to the electric drive axle assembly of commercial vehicles, so that electric commercial vehicles can obtain the optimal balance of speed, traction and efficiency. It can meet the requirements of traction, speed and efficiency in various working conditions such as light duty, heavy duty, flat road operation, and slope operation to the greatest extent, so as to reduce energy consumption and increase efficiency. In the structure of the electric drive axle, the motors, the shifting transmission mechanisms and the axle are arranged symmetrically, such that the product is compact in structure and light in weight, and the forces acting on the carriers, the forces acting on the axle housing, and the overall forces of the electric drive axle are improved, which is beneficial for the reliability of the product.

Those skilled in the art should understand that the above-mentioned embodiments are only for clearly illustrating the present disclosure, rather than limiting the scope of the present disclosure. For those skilled in the art, other changes or modifications may also be made on the basis of the above disclosure, and these changes or modifications are still within the scope of the present disclosure.

The invention claimed is:

1. An electric drive axle, comprising: an output shaft, a spindle and at least one driving assembly, wherein the spindle comprises two half shafts connected to a differential, and each driving assembly comprises a motor and an input shaft connected to the motor in a transmission way;
the output shaft is connected to the differential in a transmission way, and the output shaft is sleeved on corresponding half shaft;
the driving assembly is arranged on two sides of the output shaft;
the electric drive axle further comprises at least two gear transmission assemblies and at least one sliding sleeve shifting mechanism, the input shaft and the output shaft are connected through corresponding gear transmission assembly in a transmission way, and the sliding sleeve shifting mechanism is slidably sleeved on the output shaft, when the electric drive axle is in different speeds, the sliding sleeve shifting mechanism is connected to corresponding gear transmission assembly in a transmission way to transmit power in different speeds,
wherein each of the gear transmission assemblies comprises a driving gear arranged on the input shaft, and a driven gear meshing with the driving gear;
the driven gear is rotatably arranged on the output shaft, and when the electric drive axle is in a first transmission mode, the sliding sleeve shifting mechanism is connected to corresponding driven gear in a transmission way;
when the electric drive axle is in a second transmission mode, the transmission between the sliding sleeve shifting mechanism and the corresponding driven gear is disconnected;
wherein there are three gear transmission assemblies and two sliding sleeve shifting mechanisms, and at least one sliding sleeve shifting mechanism is provided between the two gear transmission assemblies,
when a first gear transmission assembly is connected to a first sliding sleeve shifting mechanism in a transmission way, a first shifting speed transmission mechanism is formed, and a first shifting speed transmission is performed, when a second gear transmission assembly is connected to the first sliding sleeve shifting mechanism in a transmission way, a second shifting speed transmission mechanism is formed, and a second shifting speed transmission is performed, and when a third gear transmission assembly is connected to a second sliding sleeve shifting mechanism in a transmission way, a third shifting speed transmission mechanism is formed, and a third shifting speed transmission is performed, the first shifting speed transmission mechanism includes a driving gear I, a driving gear II and a driven gear I, the driving gear I is arranged on a first input shaft, and the driving gear II is arranged on a second input shaft, the driven gear I is arranged on the output shaft, and the driven gear I meshes respectively with the driving gear I and the driving gear II for power transmission,
the second shifting speed transmission mechanism includes a driving gear III, a driving gear IV and a driven gear II, the driving gear III is arranged on the first input shaft, and the driving gear IV is arranged on the second input shaft, the driven gear II is arranged on the output shaft, and the driven gear II meshes with the driving gear III and the driving gear IV respectively for power transmission,
the third shifting speed transmission mechanism includes a driving gear V, a driving gear VI and a driven gear III, the driving gear V is arranged on the first input shaft, the driving gear VI is arranged on the second input shaft, and the driven gear III is arranged on the output shaft, the driven gear III meshes with the driving gear V and the driving gear VI respectively for power transmission;
wherein the electric drive axle further comprises a shift control unit electrically connected to the sliding sleeve shifting mechanism, which is used to control the sliding sleeve shifting mechanism to connect to the corresponding driven gear in a transmission way in the first transmission mode, and control the sliding sleeve shifting mechanism to disconnect the transmission with the corresponding driven gear in the second transmission mode,
the sliding sleeve shifting mechanism includes a sliding sleeve and a shifting fork, the sliding sleeve is sleeved on the output shaft, and the sliding sleeve is sleeved on the output shaft through a spline and slide along the output shaft, and the shifting fork is connected with the sliding sleeve, and the shifting fork is driven by the shift control unit, so that the sliding sleeve can slide and can be connected to the corresponding gear transmission assembly in a transmission way, so as to switch between different speeds.

2. The electric drive axle according to claim 1, wherein there are two driving assemblies, and the two driving assemblies are symmetrically arranged on two sides of the spindle.

3. The electric drive axle according to claim 1, wherein the electric drive axle further comprises a torque increasing module arranged between the differential and the output shaft, and the output shaft and the differential are connected through the torque increasing module in a transmission way.

4. The electric drive axle according to claim 3, wherein the torque increasing module comprises a planetary gear mechanism, a planetary carrier of the planetary gear mechanism is connected to the differential, and a sun gear of the planetary gear mechanism is connected to the output shaft.

5. The electric drive axle according to claim 4, wherein a gear ratio of the planetary gear mechanism is 1:15.

6. An automobile, comprising the electric drive axle according to claim 1.

* * * * *